US008759773B2

(12) United States Patent
Robinson (10) Patent No.: US 8,759,773 B2
(45) Date of Patent: Jun. 24, 2014

(54) INFRARED SPECTROMETER WITH ENHANCED READOUT SPEED

(75) Inventor: Ian Stuart Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 164 days.

(21) Appl. No.: 13/450,371

(22) Filed: Apr. 18, 2012

(65) Prior Publication Data

US 2013/0277560 A1    Oct. 24, 2013

(51) Int. Cl.
  *G01J 5/02* (2006.01)
  *G01J 3/28* (2006.01)
(52) U.S. Cl.
  CPC .......................................... *G01J 3/28* (2013.01)
  USPC .................................................... 250/339.01
(58) Field of Classification Search
  CPC ................... G01N 2021/3595; A61B 5/7257; G01J 3/28; G06T 7/0012
  USPC ................................ 250/339.01–339.15, 340
  See application file for complete search history.

(56) References Cited

U.S. PATENT DOCUMENTS

| | | | |
|---|---|---|---|
| 5,422,721 A | 6/1995 | Ryan | |
| 5,539,518 A | 7/1996 | Bennett | |
| 5,963,322 A | 10/1999 | Rapp et al. | |
| 5,965,889 A | 10/1999 | Brierley | |
| 7,034,944 B2 | 4/2006 | Rapp et al. | |
| 2003/0103209 A1 | 6/2003 | Simon | |
| 2008/0123097 A1* | 5/2008 | Muhammed et al. | 356/419 |

OTHER PUBLICATIONS

Prel, et al., "MRi Dual Band MWIR Imaging FTS", Proceedings of SPIE, vol. 8014, May 13, 2011, (pp. 801411-1-801411-10).
NASA's Jue Propulsion Laboratory et al., "Fourier-Transform Infrared Spectrometer", NTIS Tech Notes, US Department of Commerce, Springfield, VA, US, vol. 4, No. J, Apr. 1986 (Apr. 1984), (2 pgs.).
Bernier, et al, "First Results and Current Development of SpIOMM: An Imaging Fourier Transform Spectrometer for Astronomy", Proceedings of SPIE, vol. 6269, Jun. 14, 2006, (pp. 626949-1-626949-9).
Written Opinion of the International Searching Authority for International Application No. PCT/US2013/026522, filed Feb. 15, 2013, Written Opinion of the International Searching Authority mailed Aug. 13, 2013 (9 pgs.).
International Search Report for International Application No. PCT/US2013/026522, filed Feb. 15, 2013, International Search Report dated May 15, 2013 and mailed Aug. 13, 2013 (7 pgs.).

(Continued)

*Primary Examiner* — Kiho Kim
(74) *Attorney, Agent, or Firm* — Christie, Parker & Hale, LLP (57) ABSTRACT

A Fourier transform infrared spectrometer includes a beam splitter (22), end mirrors (21, 23), one of which may be scanned, and detectors (32) detecting the interfered light at the two outputs of a beam combiner (22), which may be the same optical element as the beam splitter (22). Time records of detector samples may be transformed by Fourier transform to obtain the corresponding spectra. The detectors (32) may be sampled alternately in time and the samples subsequently interleaved to provide an increased effective sampling rate. The detectors (32) may be masked by color filter mosaics so that each pixel of each detector is sensitive only to one color of light, and the spectra obtained from pixels detecting different colors may be concatenated.

16 Claims, 5 Drawing Sheets

(56) References Cited

OTHER PUBLICATIONS

Prel, et al., "MR-*i* Dual Band MWIR Imaging FTS", Proceedings of SPIE, vol. 8014, May 13, 2011 (pp. 801411-1-801411-10).
NASA's Jet Propulsion Laboratory et al., "Fourier-Transform Infrared Spectrometer", NTIS Tech Notes, US Department of Commerce, Springfield, VA, US, Vo. 4, No. J, Apr. 1986, p. 448, XP-002073971 (2 pgs.).
Bernier, et al. "First results and current development of SpIOMM: an imaging Fourier transform spectrometer for astronomy", Proceedings of SPIE, vol. 6269, Jun. 14, 2006 pp. 626949-1-626949-9.
Invitation to Pay Additional Fees and, Where Applicable Protest Fee for International Application No. PCT/US2013/026522, filed Feb. 15, 2013, Applicant, Raytheon Company, Invitation mailed May 24, 2013 (6 pgs.).

\* cited by examiner

INFRARED SPECTROMETER WITH ENHANCED READOUT SPEED

BACKGROUND

1. Field

One or more aspects of embodiments according to the present invention relate to Fourier transform infrared spectrometers and in particular to methods for improving the operating speed of such spectrometers.

2. Description of Related Art

Imaging spectrometers are instruments which measure the spectrum of light received from a scene being observed, at each point in the observed image. In the case of an infrared spectrometer, much of this light may be thermally emitted radiation, with a blackbody envelope depending on the temperature of the emitting object, and with deviations from the blackbody spectrum at wavelengths at which the emissivity of the emitting surface is less than that of a blackbody. Such data may be useful for remote temperature measurements or for remotely identifying materials, for example.

An imaging spectrometer may be constructed from a Michelson interferometer, in which the length of one arm is scanned by moving a scan mirror. For a uniform scan rate the optical power at the output of the interferometer corresponds to the autocorrelation function of the incident light; taking the Fourier transform of the autocorrelation, for example using a fast Fourier transform (FFT) algorithm, results in the spectrum of the light. An instrument that operates in this manner is known as a Fourier transform spectrometer (FTS). A lens may be placed at the output of the interferometer, so that light from different source points in the scene is focused on different pixels of a detector, making it possible to obtain individual spectra for different points in the scene. Each exposure sampled by the detector is known as an interferogram, or sample.

In a spectrum obtained from a conventional FTS, the number of spectral bands obtained is less than or equal to N/2 where N is the number of detector samples obtained during the scan. The spectral resolution is given by 1/(2L), where L is the change in position of the scan mirror. For example, if the scan mirror moves 0.125 centimeters (cm), then the wave number separation between adjacent spectral bands will be 4 per cm (cm-1), where the wave number is the reciprocal of the wavelength, with a scaling factor of 1e4 if units of cm-1 and microns are used for wave number and wavelength, respectively. In this example, 150 samples would be required to cover the range of wavelengths between 7.4 and 13.5 microns, which corresponds to wave numbers ranging from 740 cm-1 to 1340 cm-1 (where, for example, the wave number corresponding to 7.4 microns is 1e4/7.4, or 1340, cm-1).

An uncooled microbolometer is an inexpensive infrared detector array fabricated, for example, for use in infrared cameras. For use in an imaging FTS, an uncooled microbolometer has the advantage that no components need to be cooled but the disadvantage, compared to other detector technologies, of a relatively low sample rate, which may be 60 frames per second. At this rate, obtaining 150 samples, for example, will take 2.5 seconds, and, in this interval, the scene may change, resulting in ambiguous data. There is a need, then, for a spectrometer to more rapidly collect scans while using uncooled microbolometer detectors.

SUMMARY

In the operation of an imaging infrared spectrometer, it is desirable to complete each scan quickly, so that the scene being observed will not change while the scan is in progress. Generally the scan time may be decreased by decreasing the optical bandwidth or by degrading the spectral resolution, both of which are undesirable.

In the present invention the scan time may be reduced, while maintaining bandwidth and spectral resolution, by any of, or a combination of, several techniques. Both outputs of an interferometer's beam combiner may be imaged onto detectors. Pairs of pixels in the detector arrays may be sampled alternately, and the samples interleaved in time, to form a time record with twice the sampling rate as that of either detector. Color filter mosaics may be placed in front of the detectors so that each pixels is sensitive only to a portion of the spectrum being measured; the spectra obtained from different pixels within an optical blur may subsequently be concatenated to form the entire spectrum. Adjacent pixels, especially those within a common optical blur, may be read out alternately, or in sequence, and their data streams interleaved. The resulting stream may then be transformed to create a higher resolution spectrum.

According to an embodiment of the present invention there is provided an infrared Fourier transform spectrometer. The spectrometer includes: an optical structure configured to split received light into two paths; two mirrors for reflecting the light in the two paths, wherein at least one mirror is movable to perform a scan; the optical structure being further configured to combine the light reflected by the mirrors, the optical structure having two outputs, and a first detector at a first output, and a second detector at a second output, for detecting the light flux at the first and second outputs respectively; each detector having a plurality of pixels, two of the pixels being configured to obtain pixel samples alternately in time.

In one embodiment one of the pixels configured to obtain pixel samples alternately in time is in the first detector, and the other of the pixels configured to obtain pixel samples alternately in time is in the second detector.

In one embodiment the spectrometer includes a processing unit configured to interleave the pixel samples in time order, to form a single time record.

In one embodiment the processing unit is further configured to transform the single time record to a spectrum.

In one embodiment the processing unit is configured to transform the single time record to the spectrum by the use of a fast Fourier transform.

In one embodiment the spectrometer is configured to obtain at least 50 samples per scan at each of the detectors.

In one embodiment the spectrometer is configured to complete a scan in less than 1 second.

In one embodiment at least one additional beam splitter is employed to split the light at at least one beam combiner output onto at least two detectors.

According to an embodiment of the present invention there is provided an infrared Fourier transform spectrometer. The spectrometer includes: an optical structure configured to split received light into two paths; two mirrors for reflecting the light in the two paths, wherein at least one mirror is movable to perform a scan; the optical structure being further configured to combine the light reflected by the mirrors, the optical structure having two outputs; at least one detector, comprising pixels, at one of the two outputs, for detecting the light flux at the output, and at least one color filter mosaic interposed between an output of the optical structure and a detector, wherein the color filter mosaic includes filters of at least two different colors.

In one embodiment at least one filter has dimensions substantially equal to the dimensions of a corresponding detector pixel.

In one embodiment at least one color filter mosaic comprises a plurality of sets of color filters, each set comprising a plurality of color filters having substantially the same dimensions and pitch as the dimensions and pitch of a corresponding plurality of detector pixels.

In one embodiment at least one pair of pixels is illuminated through filter elements of the same color, and the pixels in the pair of pixels are sampled alternately.

In one embodiment the processing unit is configured to form a time record comprising the samples from the pair of pixels interleaved in time order.

In one embodiment the processing unit is configured to transform the time record to the spectrum by the use of a fast Fourier transform.

According to an embodiment of the present invention there is provided a method of operating an interferometer having a scan mirror and two outputs, and a detector at each output, each detector having a plurality of pixels. The method includes moving the scan mirror with constant velocity while sampling two pixels alternately, sampling each of the two pixels at a uniform sampling rate; the samples from one of the two pixels offset in time from the samples from the other pixel, interleaving the samples to obtain a time record and performing a Fourier transform of the time record.

In one embodiment the performing a Fourier transform is accomplished by performing a fast Fourier transform.

In one embodiment each one of the two pixels is sampled at points in time that are half-way between the points in time at which the other of the two pixels is sampled.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of the presently preferred embodiments of an infrared spectrometer with enhanced readout speed provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

Figure 1:
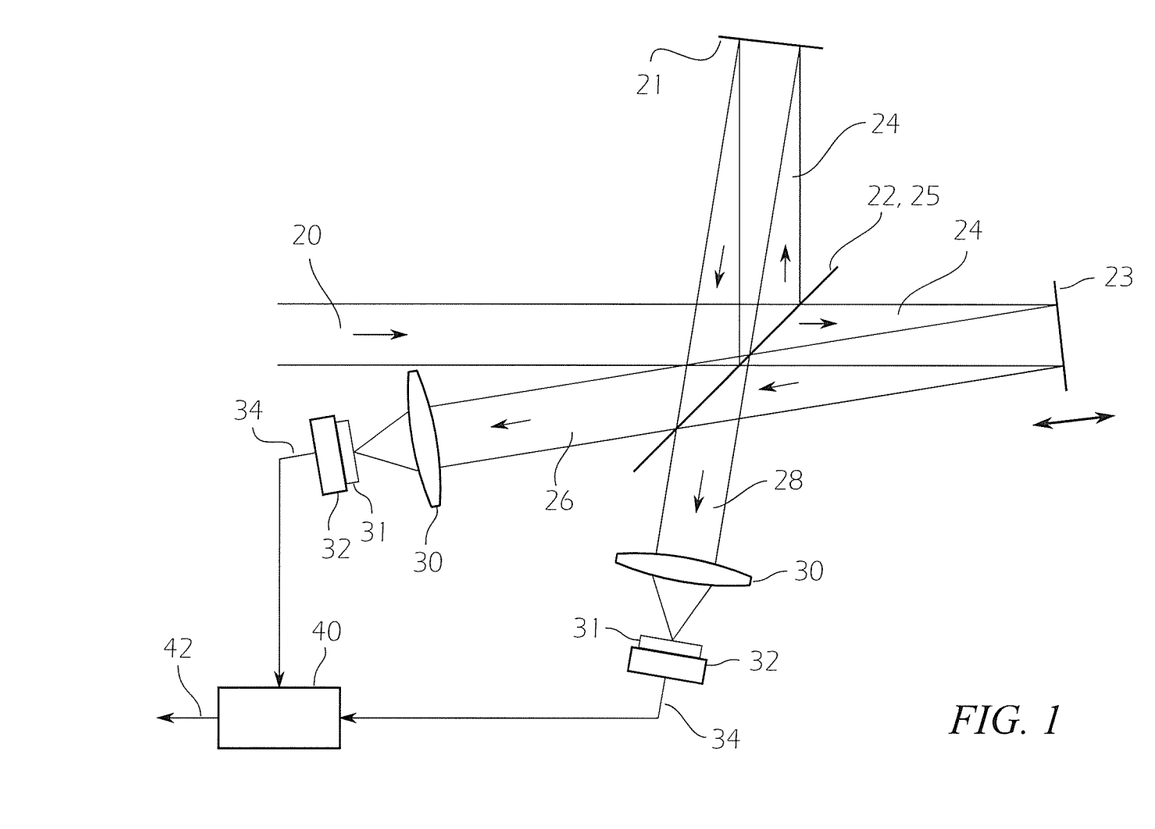
FIG. 1 is a schematic view of an imaging Fourier transform spectrometer according to an embodiment of the present invention.

Referring to FIG. 1, received light 20 from a scene of interest enters a Michelson interferometer, where it is split by an optical structure such as a partially reflecting optical element or beam splitter 22; the two beams 24 formed by the beam splitter 22 propagate the length of two arms, an inline aim and a perpendicular arm. The two beams reflect from an end mirror 23 in the inline arm and an end mirror 21 in the perpendicular arm, and return to the optical structure, which also operates as a beam combiner 25, and recombines, or interferes, the beams, forming an inline output beam 26, and a perpendicular output beam 28. A lens 30 and a detector 32 may be placed in the path of the perpendicular output 28. The mirrors 21, 23 at the ends of the interferometer arms are intentionally installed so that they are not perpendicular to the beams they respectively reflect, so that the inline output beam 26 is offset from the received light input 20. This allows a lens 30 and detector 32 to be placed in the path of the inline output 26, without blocking the interferometer input, making the signal from both the perpendicular output 28 and the inline output 26 available. Detecting the light at both outputs increases the amount of signal available, and, therefore, results in an improvement in the signal to noise ratio (SNR). In prior art embodiments employing this optical configuration, the detectors may be sampled simultaneously and the samples combined to improve the SNR. In one prior art embodiment (not illustrated), a color-separating beam splitter, such as a dichroic filter, may be placed at an angle in front of the imaging lens at the perpendicular output, and another imaging lens and detector may be added to the system to capture the light reflected from each such beam splitter. Because each detector is capturing only a portion of the spectrum, this embodiment makes it possible to take fewer samples with each detector during the scan, and therefore to complete the scan approximately twice as quickly. It requires an additional detector, however, and may result in a physically larger assembly.

Referring still to FIG. 1, in one embodiment of the present invention, the two detectors 32 may be read out, or sampled, alternately instead of simultaneously, i.e., the samples from the inline detector may be offset in time from the samples from the perpendicular detector. The samples from each pixel on the inline detector may then be interleaved in time with the samples from the corresponding pixel on the perpendicular detector, and combined into a single data stream, so that the effective sampling rate is doubled. For example, if detectors with a sample rate of 60 samples per second are used, then the sampling interval is approximately 16.6 milliseconds (ms). One detector may be sampled 8.3 ms after the other, so that a new sample is obtained, from one detector or the other, at a rate of 120 samples per second. An FFT may then be taken to generate a spectrum.

Sampling the detectors alternately allows the scan mirror 23 to be moved at twice the speed, and, if the maximum scan time is constrained by the need to avoid motion in the scene during a scan, the scan mirror may move through twice the distance in that time, resulting in spectral resolution which is twice as good. It may be convenient to align the detectors 32 in such a manner that a pixel at a given location in one detector samples light from the same point in the scene as a pixel in the same location in the other detector.

Figure 2:
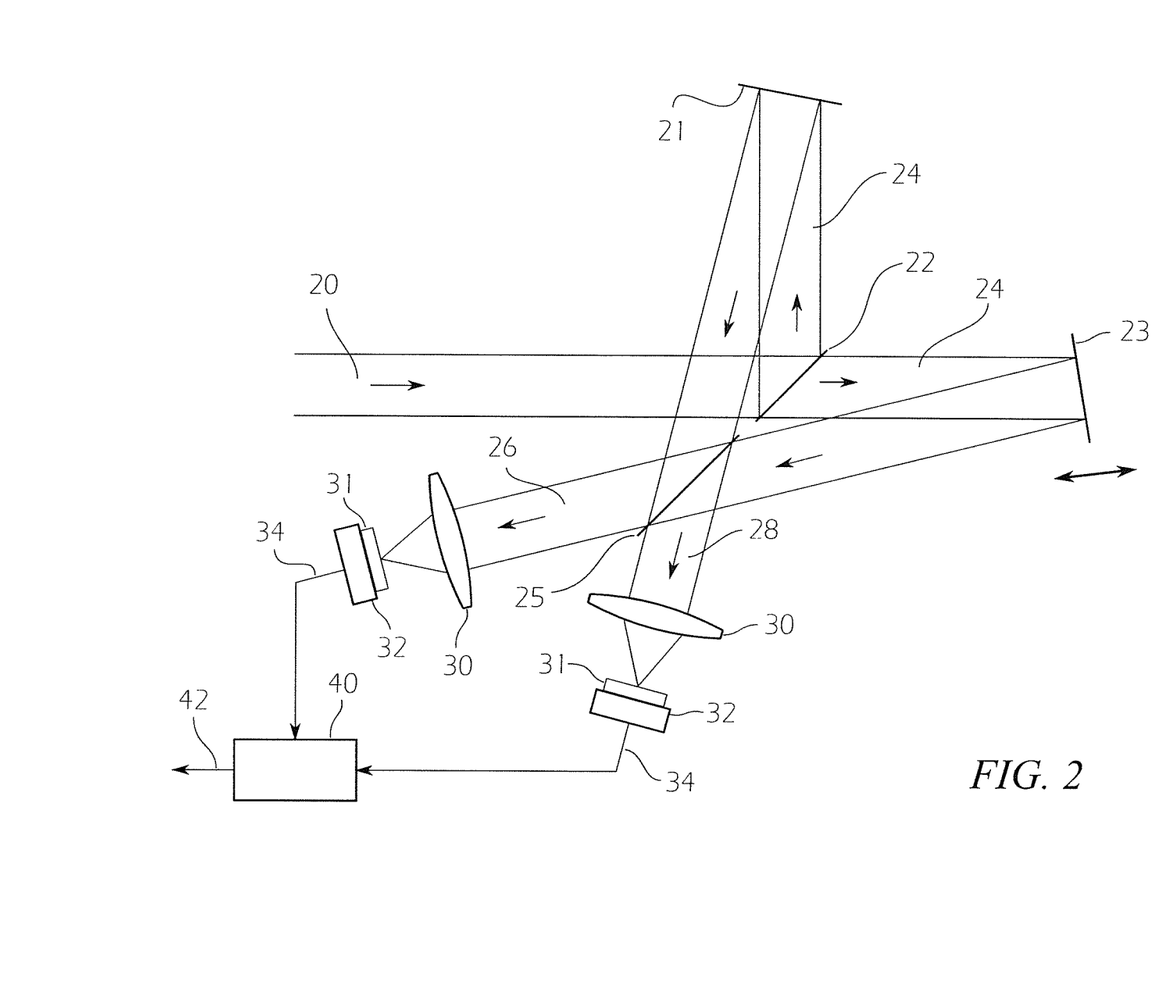
FIG. 2 is a schematic view of an imaging Fourier transform spectrometer according to another embodiment of the present invention.

Although in the embodiment illustrated in FIG. 1 the mirrors 21, 23 are shown as conventional mirrors, i.e., flat reflective surfaces, the present invention is not thereby limited. The term "mirror" is used herein to denote any optical element or structure which alters the direction of a substantial portion of the light incident upon it. Thus, as used herein, a "mirror" may include structures altering the direction of light by means of a single reflection, multiple reflections, or other means, and reflections may be from metal or metalized surfaces, or from other interfaces, including for example a glass-air interface at which total internal reflection occurs. The term "mirror" as used herein includes a corner cube and a prism. Moreover, although the beam splitter 22 and beam combiner 25 are shown in the embodiment of FIG. 1 as a single flat optical element, they may be separate elements as illustrated in FIG. 2, or separate structures each including one or more optical elements.

In operation, when the scan mirror 23 is moved, the interference at the beam combiner 22 changes. Light incident on the beam combiner 22 may interfere constructively or destructively at the inline output 26 and at the perpendicular output 28. Because energy is conserved, when light at a particular wavelength interferes constructively at the inline output 26 it must interfere destructively at the perpendicular output 28, and vice versa. Although in the embodiment illustrated in FIG. 1 the inline end mirror 23 is the scan mirror, the present invention is not thereby limited; the perpendicular mirror 21 may be scanned instead of, or in addition to, the inline mirror 23.

In one embodiment of the present invention, data from the outputs 34 of the detectors 32 is fed into a processing unit 40, where it may be processed to produce output data, at the processing unit output 42, representing a set of spectra, each corresponding to the spectrum at one point in the image, viz. the spectrum of light emitted by one point in the scene being observed.

In a related embodiment of the present invention, additional optical beam splitters may be placed between the beam combiner 25 and the detectors 32, to split the light onto a larger number of detectors, the sampling of which may then be staggered with a smaller offset, and the samples interleaved, resulting in an effective sampling rate that is further increased. This embodiment, however, carries the additional cost of including additional detectors, and it may result in a physically larger assembly.

Referring to FIG. 1 and FIG. 2, in one embodiment of the present invention a mosaic 31 of color filters may be placed in front of the detectors 32 to suballocate the optical spectrum being measured among several pixels. Like the alternate sampling technique disclosed above, this novel arrangement may result in an improvement in scan time compared to a prior art Fourier transform spectrometer constructed according to the optical configuration of FIG. 1 and FIG. 2, but excluding the color filter mosaic 31.

Figure 3A:
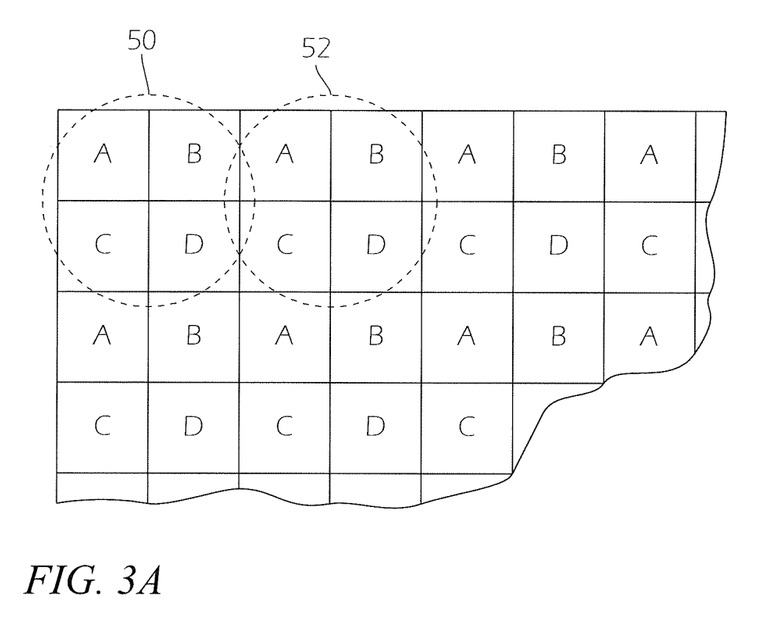
FIG. 3A is a view of a spectral filter mosaic deployed in front of a detector according to an embodiment of the present invention.

Referring to FIG. 3A, in one embodiment of the present invention a repeating pattern of sets of four different colors, A, B, C, and D, arranged in a square, may be used, wherein each color filter covers one pixel in the detector, allowing that pixel to receive only the corresponding color. To detect a wave number range of 740 cm-1 to 1340 cm-1, for example, filters having color A ("A filters") may transmit wave numbers in the range 740 cm-1 to 890 cm-1, B filters may transmit 890 cm-1 to 1040 cm-1, C filters may transmit 1040 cm-1 to 1190 cm-1, and D filters may transmit 1190 cm-1 to 1340 cm-1. Filter passbands that are evenly spaced in wave number, as in this example, may be preferred, because the FFT of a time series with evenly spaced time samples results in a spectrum with spectral bands evenly spaced in wave number. After one scan of the scan mirror, the time record from each pixel may be transformed by FFT to a spectrum for that pixel; the spectra for adjacent pixels of different colors may then be concatenated to form a spectrum covering the entire wave number range of interest. For example, the spectra from adjacent A, B, C, and D pixels forming a square on the detector may be concatenated to form a single spectrum for that square, spanning wave numbers ranging from 740 cm-1 to 1340 cm-1.

It is preferable in this embodiment of the present invention that the optical blur of the imaging system be significantly wider than a pixel, so that, for example, a pixel with color A will be exposed to light of substantially the same spectrum as adjacent pixels with colors B, C, and D. If, for example, the dashed circle denoting region 50 of FIG. 3A is the approximate size of the optical blur, then the A, B, C, and D pixels within region 50 will all be illuminated with substantially similar spectra. The concatenation of their respective spectra will then yield the spectrum of the light by which all four pixels were illuminated during the scan. It may be preferable in this embodiment to sample the pixels substantially simultaneously instead of sequentially.

A suitable optical blur may be obtained with an optical system that is F/1. Such a system will have an Airy disk diameter of approximately 24 microns for 10 micron light, sufficient to distribute light from a point in the scene over several adjacent pixels in a commercial detector with a pixel pitch of 12 microns. A slower optical system will distribute such light over a greater detector area, an F/2 system, for example, having an Airy disk diameter of approximately 49 microns for 10 micron light.

The use of color filters may result in a loss of spatial resolution, because, for example in the embodiment of FIG. 3A, only one spectrum may be generated for every four pixels, whereas one spectrum could be generated for each pixel in the absence of the filters. This loss of resolution may be mitigated by interpolating between pixels, either before or after performing FFTs to generate spectra. For example, an estimated time record of the optical power in color A at the location of the B pixel in region 50 may formed by interpolating linearly between the time records from the A pixels in regions 50 and 52. This may be done for each point in time, or, after the FFTs have been performed, for each wave number. For linear interpolation, as in this example, the result will be the same, because the FFT is a linear transformation. Non-linear interpolation may also be used, either in the time domain or in the wave number domain. Other nearby pixels of the color of interest, in addition to those immediately adjacent, may be used as inputs to the interpolation.

The use of a mosaic of color filters in front of each detector may also have benefits for cooled detectors, in which photon noise, and the full-well depth, may limit performance. In an embodiment using such a detector, if the system noise is dominated by photon noise, the multiplex benefit of a Fourier transform spectrometer is substantially lost. In this case the color filter in front of each pixel may reduce the photon flux on that pixel to include only those photons that are in the spectral range of interest. This reduces the likelihood of exceeding the full-well depth of any pixel. Moreover, light which is not in the passband of the color filter does not reach the pixel, and therefore does not contribute to photon noise in that pixel; thus, the filter reduces the noise equivalent spectral radiance (NESR) for the pixel.

Figure 3B:
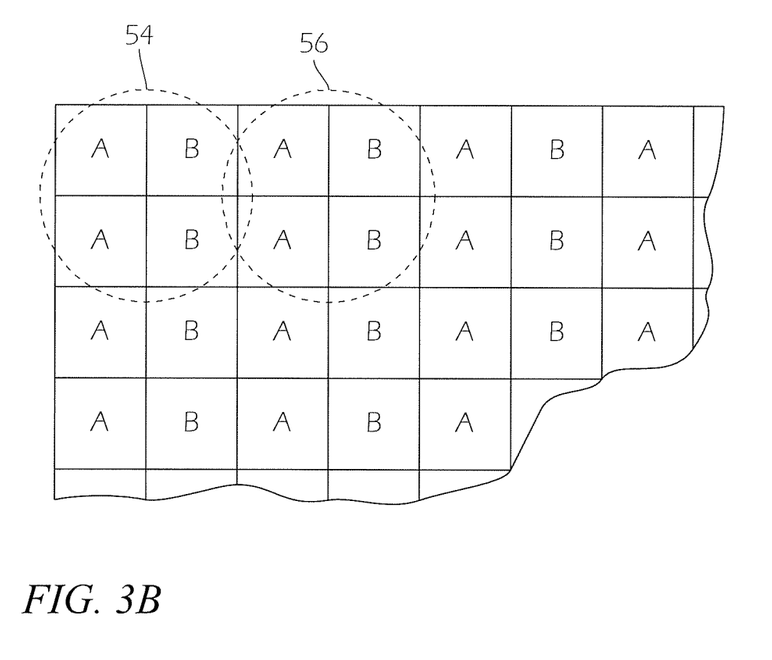
FIG. 3B is a view of a spectral filter mosaic deployed in front of a detector according to another embodiment of the present invention.

Referring to FIG. 3B, in another embodiment of the present invention these features may be combined. A filter mosaic containing two colors, A and B, may be used, and pairs of pixels with the same color may be sampled alternately and the samples interleaved. For example, the two pixels of color A in region 54 may be sampled alternately, and the two pixels of color B in region 54 may be sampled alternately. The data streams from the two A pixels may then be interleaved, and the data streams from the two B pixels may be interleaved, and FFTs of the two resulting data streams may be performed to obtain two spectra, one for color A and one for color B, which may then be concatenated. In this embodiment, the alternate sampling and interleaving of data from the two A pixels allows the scan mirror to be moved twice as far, and results in a spectrum with spectral resolution that is twice as good, as in the absence of interleaving. Concatenating the spectrum from the pair of A pixels with the spectrum from the pair of B pixels results in a spectrum that covers a broader range of wave numbers than the spectrum from either pixel pair alone.

For example, filters of color A may transmit wave numbers in the range 740 cm-1 to 1040 cm-1 and filters of color B may transmit 1040 cm-1 to 1340 cm-1. Each pixel may be sampled at a rate of 60 samples per second, with A pixels being sampled alternately and B pixels also being sampled alternately. To obtain spectral bands separated by 4 cm-1, the scan mirror will move 0.125 cm, and 75 samples will be needed for each of the two colors. At the effective sampling rate of 120 samples per second, the scan will require 0.625 seconds. After the scan is complete, the processing unit 40 may interleave the data from the two A pixels and perform an FFT on the resulting time record. This FFT will cover the wave number range 740 cm-1 to 1040 cm-1. Similarly the time records from the two B pixels may be interleaved and transformed to generate a spectrum covering 1040 cm-1 to 1340 cm-1. The two spectra may then be concatenated to produce a spectrum covering 740 cm-1 to 1340 cm-1 with spectral bands spaced 4 cm-1 apart. Other 2×2 regions, such as region 56, may be sampled in a similar manner, and the resulting data may be processed using the same method.

Figure 4:
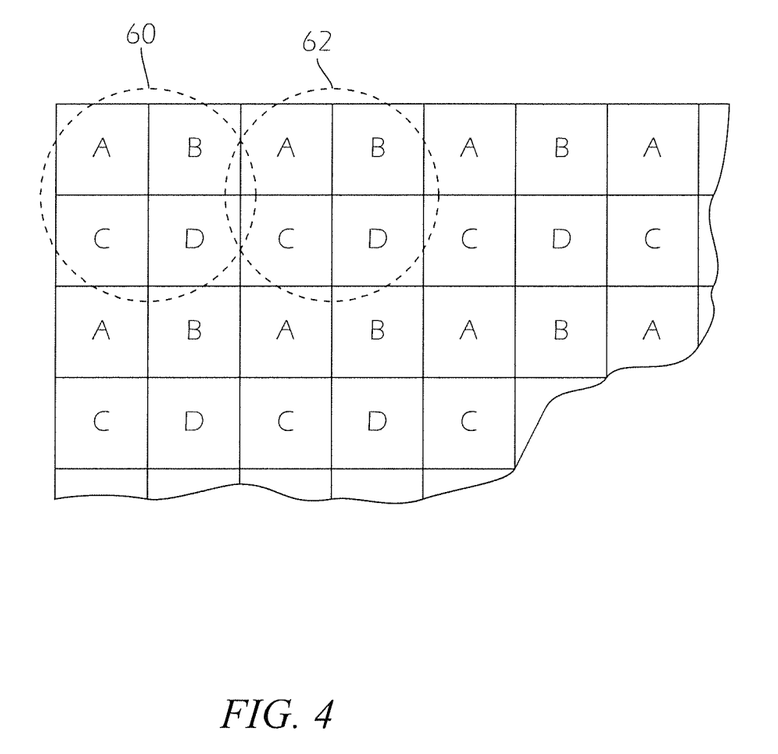
FIG. 4 is a view of a detector showing pixels sampled sequentially according to an embodiment of the present invention.

Referring to FIG. 4, in an embodiment of the present invention temporal interleaving may also be performed between pixels when no mosaic of color filters is used. If, for example, the four pixels A, B, C, and D in region 60 of the detector are all within an optical blur, then they may be sampled sequentially, and the data streams from the four pixels interleaved to form a single data stream. The effect of this sequential sampling and interleaving may be to quadruple the effective sampling rate. If, in addition, the detectors 32 are sampled alternately, so that, for example, pixel A in the inline detector is sampled first, pixel A in the perpendicular detector second, pixel B in the inline detector third, and so forth, then the effective sampling rate of the interleaved data stream will be eight times the sampling rate of any given pixel, making it possible to complete a scan in one-eighth the time.

Figure 5:
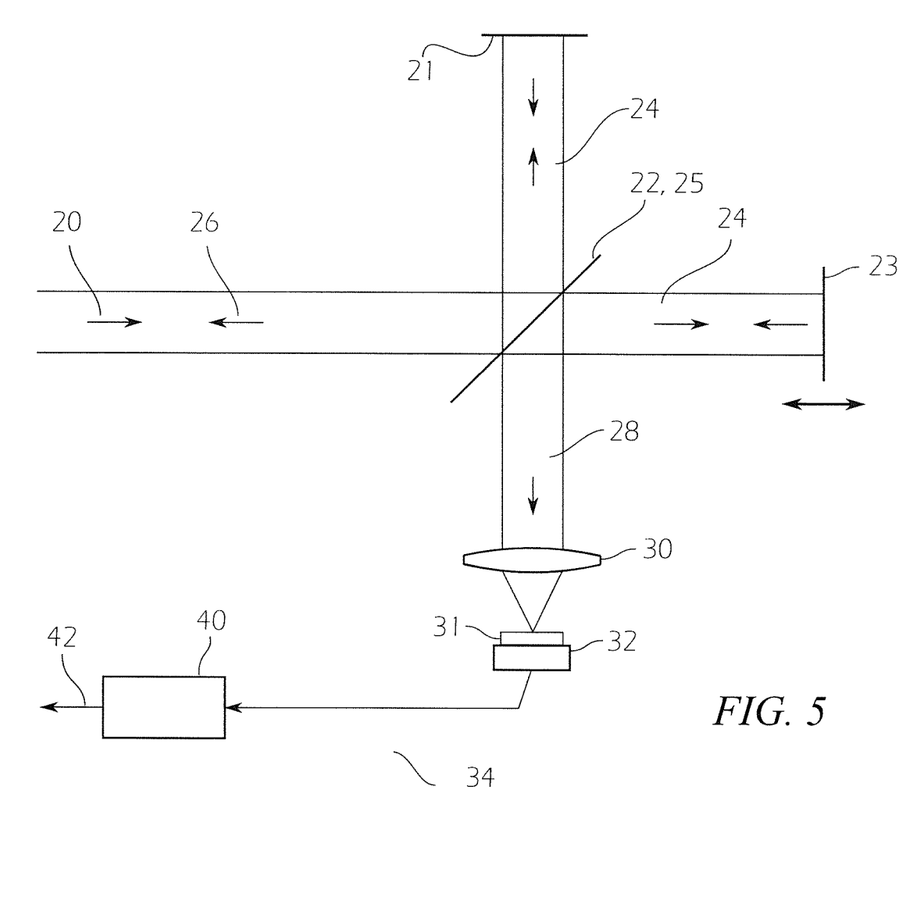
FIG. 5 is a schematic view of an imaging Fourier transform spectrometer according to an embodiment of the present invention.

Referring to FIG. 5, several of these techniques may also be employed in an embodiment of the present invention using an optical configuration in which the mirrors 21, 23 at the ends of the interferometer aims are perpendicular to the beams, and the light at the inline output is lost, because a detector placed in its path would block the interferometer input. This configuration has the disadvantage of a reduction in SNR because of the lost light, but it may be more compact. If only one detector is available, the sample rate may nonetheless be increased by employing a mosaic of color filters (FIG. 3A) or by reading out pixels within an optical blur in sequence (FIG. 4) or by some combination of these approaches (FIG. 3B).

In general, in embodiments of the present invention all of the pixels sharing an optical blur on the perpendicular detector, as well as the pixels sharing the corresponding optical blur on the inline detector, if the optical configuration includes one, sample the same spatial and spectral information, and arbitrary combinations, of sequential sampling and interleaving, and of suballocation of the optical spectrum, may be employed to decrease the scan time. For example, in a case with two detectors 32 and an optical blur covering four pixels on each detector, there are eight pixels in such a set. These may for example be divided into two optical bands using color filters, and the four pixels in each band sampled in some sequence, or they may, for example, be divided into four optical bands, and the two pixels in each band sampled alternately. If, for example, four optical bands are used, it is not necessary that all four colors be present on each detector; one detector may have a filter containing a mosaic of two colors, for example, and the other detector may have a filter containing two other colors, where the four colors cover the spectrum of interest. In yet another example, no color filters may be used and sequential sampling may be used to sample all eight pixels, in any order. These samples may then be interleaved in the same time order to form a single data stream, before taking a Fourier transform.

If combining data from multiple adjacent pixels in one detector, using sequential sampling or using color filters, or a combination of these methods, results in a loss of spatial resolution, then this loss may be mitigated using interpolation between pixels, as described above.

Although limited embodiments of an infrared spectrometer with enhanced readout speed have been specifically described and illustrated herein, many modifications and variations will be apparent to those skilled in the art. For example, a color filter mosaic with three, or more than four, colors may be used, or longer or shorter wavelengths than those in the embodiments described may be transmitted by the color filters. Accordingly, it is to be understood that an infrared spectrometer with enhanced readout speed employed according to principles of this invention may be embodied other than as specifically described herein. The invention is also defined in the following claims.

What is claimed is:

1. An infrared Fourier transform spectrometer, comprising:
   an optical structure (22, 25) configured to split received light into two paths;
   two mirrors (21,23) for reflecting the light in the two paths, wherein at least one mirror (23) is movable to perform a scan;
   the optical structure (22, 25) being further configured to combine the light reflected by the mirrors (21,23), the optical structure having two outputs (26,28); and
   a first detector (32) at a first output (26), and a second detector (32) at a second output (28), for detecting the light flux at the first and second outputs respectively;
   each detector (32) having a plurality of pixels;
   two of the pixels being configured to obtain pixel samples alternately in time.

2. The spectrometer of claim 1, wherein one of the pixels configured to obtain pixel samples alternately in time is in the first detector, and the other of the pixels configured to obtain pixel samples alternately in time is in the second detector.

3. The spectrometer of claim 1, comprising a processing unit (40) configured to form a time record comprising the pixel samples interleaved in time order.

4. The spectrometer of claim 3, wherein the processing unit (40) is further configured to transform the time record to a spectrum.

5. The spectrometer of claim 4, wherein the processing unit (40) is configured to transform the time record to the spectrum by the use of a fast Fourier transform.

6. The spectrometer of claim 1, configured to obtain at least 50 samples per scan at each of the detectors (32).

7. The spectrometer of claim 1, configured to complete a scan in less than 1 second.

8. The spectrometer of claim 1, wherein at least one additional beam splitter is employed to split the light at at least one beam combiner output onto at least two detectors.

9. An infrared Fourier transform spectrometer, comprising:
   an optical structure (22, 25) configured to split received light into two paths;
   two mirrors (21,23) for reflecting the light in the two paths, wherein at least one mirror (23) is movable to perform a scan;
   the optical structure (22, 25) being further configured to combine the light reflected by the mirrors (21,23), the optical structure (22, 25) comprising two outputs (26, 28);
   at least one detector (32), comprising pixels, at one of the two outputs (26,28), for detecting the light flux at the output; and
   at least one color filter mosaic interposed between an output of the optical structure and a detector (32),
   wherein the color filter mosaic comprises filters of at least two different colors, and
   wherein at least one pair of pixels is illuminated through filter elements (A, A) of the same color, and the pixels in the pair of pixels are sampled alternately.

10. The spectrometer of claim 9, wherein at least one filter has dimensions substantially equal to the dimensions of a corresponding pixel.

11. The spectrometer of claim 9, wherein at least one color mosaic filter comprises a plurality of sets (50,52) of color filters, each set (50,52) comprising a plurality of color filters (A, B, C, D) having substantially the same dimensions and pitch as the dimensions and pitch of a corresponding plurality of detector pixels.

12. The spectrometer of claim 11 comprising a processing unit (40), wherein the processing unit (40) is configured to form a time record comprising the samples from the pair of pixels interleaved in time order.

13. The spectrometer of claim 12, wherein the processing unit (40) is configured to transform the time record to the spectrum by the use of a fast Fourier transform.

14. A method of operating an interferometer having a scan mirror (23) and two outputs (26, 28), and a detector (32) at each output, each detector having a plurality of pixels, the method comprising:
   moving the scan mirror (23) with constant velocity while sampling two pixels alternately, sampling each of the two pixels at a uniform sampling rate, the samples from one of the two pixels offset in time from the samples from the other pixel;
   interleaving the samples to obtain a time record; and
   performing a Fourier transform of the time record.

15. The method of claim 14 wherein the performing a Fourier transform is accomplished by performing a fast Fourier transform.

16. The method of claim 14, wherein each one of the two pixels is sampled at points in time that are half-way between the points in time at which the other of the two pixels is sampled.

* * * * *